(12) United States Patent
Liao et al.

(10) Patent No.: US 11,427,390 B2
(45) Date of Patent: Aug. 30, 2022

(54) FRUIT AND VEGETABLE ANTI-FOG PACKAGING BAG

(71) Applicant: NAN YA PLASTICS CORPORATION, Taipei (TW)

(72) Inventors: Te-Chao Liao, Taipei (TW); Ching-Yao Yuan, Taipei (TW); Wen-Jui Cheng, Taipei (TW); Teng-Ko Ma, Taipei (TW); Chih-Feng Wang, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 137 days.

(21) Appl. No.: 16/678,857

(22) Filed: Nov. 8, 2019

(65) Prior Publication Data
US 2020/0198863 A1 Jun. 25, 2020

(30) Foreign Application Priority Data
Dec. 25, 2018 (TW) .................. 107147006

(51) Int. Cl.
| | | |
|---|---|---|
| *B32B 27/08* | (2006.01) | |
| *B32B 27/32* | (2006.01) | |
| *B65D 65/40* | (2006.01) | |
| *B32B 27/28* | (2006.01) | |
| *B32B 27/20* | (2006.01) | |
| *B29C 48/00* | (2019.01) | |
| *B29C 48/08* | (2019.01) | |
| *B29C 48/21* | (2019.01) | |

(Continued)

(52) U.S. Cl.
CPC .......... *B65D 65/40* (2013.01); *B29C 48/0018* (2019.02); *B29C 48/022* (2019.02); *B29C 48/08* (2019.02); *B29C 48/21* (2019.02); *B32B 27/08* (2013.01); *B32B 27/20* (2013.01); *B32B 27/28* (2013.01); *B32B 27/32* (2013.01); *B65D 81/24* (2013.01); *B29K 2023/12* (2013.01); *B29K 2105/0085* (2013.01); *B29L 2007/008* (2013.01); *B32B 27/18* (2013.01);
(Continued)

(58) Field of Classification Search
CPC ........ B65D 65/40; B65D 81/24; B65D 31/02; B65D 33/04; B65D 85/34; B65D 31/00; B32B 27/08; B32B 27/32; B32B 27/28; B32B 27/20; B32B 2250/24; B32B 27/18; B32B 2307/31; B32B 2264/107; B32B 2439/70; B32B 2307/412; B29C 48/022; B29C 48/08; B29C 48/21; B29C 48/0018; B29C 48/10; B29L 2007/008; B29K 2013/12; B29K 2105/0085; C08L 23/14; C08L 23/12; Y10T 428/1334; Y10T 428/1352

See application file for complete search history.

(56) References Cited

U.S. PATENT DOCUMENTS 4,876,146 A * 10/1989 Isaka .................. B32B 7/02
428/347
7,052,774 B2 5/2006 Holzer
(Continued)

FOREIGN PATENT DOCUMENTS

| CN | 101439782 A | 5/2009 |
|---|---|---|
| CN | 103153618 A | 6/2013 |

(Continued)

*Primary Examiner* — James C Yager
(74) *Attorney, Agent, or Firm* — Li & Cai Intellectual Property (USA) Office

(57) ABSTRACT

A fruit and vegetable anti-fog packaging bag, which is produced with a polypropylene multilayer film, is manufactured by a high-speed bag making machine.

6 Claims, 1 Drawing Sheet

(51) Int. Cl.
  *B65D 81/24* (2006.01)
  *B29L 7/00* (2006.01)
  *B29K 23/00* (2006.01)
  *B29K 105/00* (2006.01)
  *B32B 27/18* (2006.01)

(52) U.S. Cl.
  CPC ..... *B32B 2250/24* (2013.01); *B32B 2264/107* (2013.01); *B32B 2307/31* (2013.01); *B32B 2439/70* (2013.01); *Y10T 428/1334* (2015.01); *Y10T 428/1352* (2015.01)

(56) References Cited

U.S. PATENT DOCUMENTS

| | | | |
|---|---|---|---|
| 2004/0053063 A1 | 3/2004 | Porter et al. | |
| 2004/0115424 A1* | 6/2004 | Cowton | C08J 7/043 428/327 |
| 2012/0094042 A1* | 4/2012 | Lee | C08L 23/10 428/35.7 |

FOREIGN PATENT DOCUMENTS

| | | |
|---|---|---|
| CN | 104736341 A | 6/2015 |
| CN | 107323048 A | 11/2017 |
| JP | 200311297 A | 1/2003 |
| JP | 2003170554 A | 6/2003 |
| JP | 2003237827 A | 8/2003 |
| JP | 2003292699 A | 10/2003 |
| JP | 2005200628 A | 7/2005 |
| JP | 2013103751 A | 5/2013 |
| JP | 2016215439 A | 12/2016 |
| TW | 201806774 A | 3/2018 |

\* cited by examiner

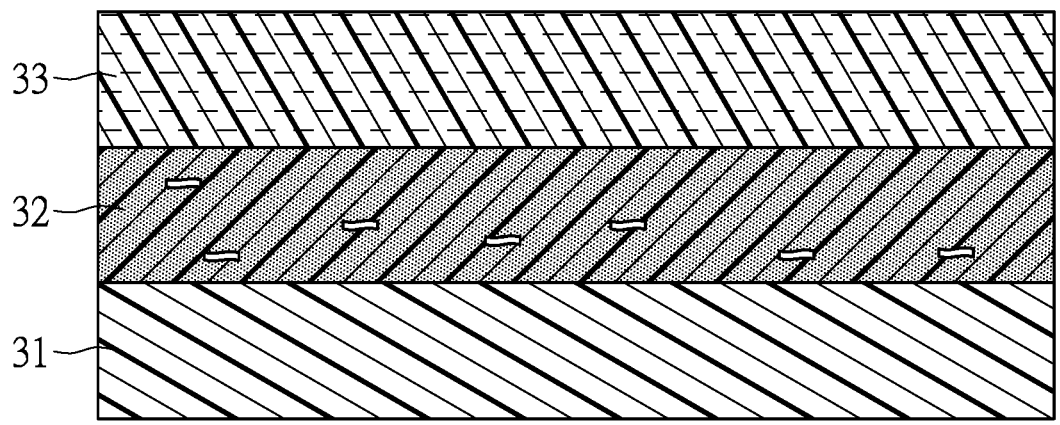

FRUIT AND VEGETABLE ANTI-FOG PACKAGING BAG

CROSS-REFERENCE TO RELATED PATENT APPLICATION

This application claims the benefit of priority to Taiwan Patent Application No. 107147006, filed on Dec. 25, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a packaging bag, and more particularly to a fruit and vegetable anti-fog packaging bag that can be easily opened, and that has excellent transparency and anti-fog property.

BACKGROUND OF THE DISCLOSURE

In order to enhance freshness of packaged contents and reduce damage of plant heat and ripening, a packaging bag for fruits and vegetables (hereinafter referred to as a fruit and vegetable packaging bag) needs to have the characteristics of good transparency and the ability to reduce the formation of water droplets. In order to for the fruit and vegetable packaging bag to have good anti-fog property, the related art adopts an anti-fog film which has been subjected to special anti-fog treatment to produce a fruit and vegetable packaging bag. In addition to the excellent anti-fog effect, the fruit and vegetable packaging bag after being processed by a bag making machine needs to meet the following characteristics:
1. Excellent transparency and anti-fog property.
2. Improves gloss, reduces fog and prevents water droplets from forming to maintain bag transparency and food freshness.
3. High thermal fracturing strength.

To make the process for producing the fruit and vegetable packaging bag by thermal-cutting anti-fog processing simpler, so as to improve the production speed of bag making process.
4. Good slip property.

During packaging, the bag mouth of the fruit vegetable packaging bag can be easily opened, and not stuck together, and the contents can be smoothly slid into the bag without causing difficulties.
5. High heat sealing strength.

The bag mouth of the fruit and vegetable packaging bag has high heat sealing strength after heat sealing.

However, the anti-fog film bag production process in the related art has a low yield, with an upper limit of approximately 150 bags per minute (≤150 bags/min) Under high-speed bag making, the anti-fog film in the related art may have low thermal fracturing strength, which may result in bag breakage after the contents are filled in.

SUMMARY OF THE DISCLOSURE

In response to the above-referenced technical inadequacies, the present disclosure provides a polypropylene multilayer film with excellent transparency, anti-fog effect and high thermal fracturing strength, and adapts to the bag making machine to produce transparent anti-fog fruit and vegetable packaging bags at a high speed of more than 150 bags per minute (≥150 bags/min).

In one aspect, the present disclosure provides a fruit and vegetable anti-fog packaging bag, which is produced with a three-layer laminated polypropylene multilayer film with a total thickness of 15-80 μm. The polypropylene multilayer film includes a heat seal layer laminated underneath, a surface layer or heat seal layer laminated the top, and a substrate layer sandwiched between the heat seal layer and the surface layer or the heat seal layer. The heat seal layer is produced with at least one selected from the group consisting of propylene-ethylene-butene copolymer and propylene-butene copolymer, and the surface of the heat seal layer is treated with corona. The substrate layer is produced with at least one selected from the group consisting of propylene and propylene-butene copolymer, and the substrate layer includes 1-10 wt % of an anti-fogging agent. The surface layer is produced with at least one selected from the group consisting of propylene, propylene-ethylene-butene copolymer and propylene-butene copolymer.

In certain embodiments, based on the total thickness of the polypropylene multilayer film, the heat seal layer accounts for 4-10%, the substrate layer accounts for 80-92%, and the surface layer accounts for 4-10%.

In certain embodiments, the heat seal layer further includes 1-10 wt % of resin based on the total weight of the heat seal layer, and the lowest melting point of the resin is from 70° C. to 90° C.

In certain embodiments, the substrate layer further includes 1-5 wt % of resin based on the total weight of the substrate layer, and the lowest melting point of the resin is from 70° C. to 90° C.

In certain embodiments, the surface layer further includes 1-10 wt % of resin based on the total weight of the heat seal layer, and the lowest melting point of the resin is from 70° C. to 90° C.

In certain embodiments, the anti-fogging agent is one or more selected from the group consisting of glycerin fatty acid esters, sorbitan fatty acid esters, glycerin monoesters, and sorbitan monoester ethylene oxide adducts.

In certain embodiments, the heat sealing strength of the heat seal layer is equal to or greater than 3.5N/15 mm.

In certain embodiments, the heat seal layer or the surface layer further includes 1-7 wt % of inorganic particles based on the total weight of the heat seal layer further or the surface layer, and the inorganic particles are one or more selected from the group consisting of silica, talc, and mica with a particle size between 0.2 μm and 10 μm.

Therefore, the fruit and vegetable anti-fog packaging bag of the present disclosure has excellent transparency, anti-fog property, good slip property and high heat sealing strength, and can be widely applied in fruit and vegetable packaging.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 1 is an enlarged sectional view of a polypropylene multilayer film of the fruit and vegetable anti-fog packaging bag of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the polypropylene multilayer film 30 of the fruit and vegetable anti-fog packaging bag of the present disclosure is a three-layer co-extruded biaxially stretched polypropylene multilayer film, which is a three-layer laminated structure that is formed by the heat seal layer 31 at the lowermost layer, the substrate layer 32 sandwiched between the lowermost layer and the uppermost layer, and the surface layer 33 laminated on the uppermost layer. It should be noted that, in another embodiment, the surface layer can also be a heat seal layer.

The substrate layer 32 sandwiched between the lowermost layer and the uppermost layer can be one sheet of the substrate layer 32, or three sheets of the substrate layer 32 to form a multilayer structure.

The polypropylene multilayer film 30 of the present disclosure has excellent transparency, anti-fog property and high thermal fracturing strength and the polypropylene multilayer film 30 has a thickness of 15 µm to 80 µm, preferably 20 µm to 40 µm. Further, the relative thickness of the heat seal layer 31 is 4-10% of the total thickness; the relative thickness of the substrate layer 32 is 80-92%% of the total thickness; the relative thickness of the surface layer 33 is 4-10% of the total thickness.

During the process of producing the fruit and vegetable anti-fog packaging bag, the bag making machine heat seals two of the polypropylene multilayer film 30 into a vegetable and fruit packaging bag. The heat sealing conditions are: a pressure of 0.1 MPa, a time of 0.5 seconds, and the optimum heat sealing strength is greater than or equal to 3.5N/15 mm, this can ensure that the contents of the packaging bag will not easily fall out.

The polypropylene multilayer film 30 of the present disclosure adapts to the bag making machine to produce fruit and vegetable anti-fog packaging bags at a high speed of more than 150 bags per minute (≥150 bags/min), and the fruit and vegetable anti-fog packaging bag produced has excellent transparency, anti-fog property, good slip property and high heat sealing strength, and can be widely applied in fruit and vegetable packaging.

Referring to FIG. 1, the surface of the heat seal layer 31 of the polypropylene multilayer film 30 of the present disclosure is required to have anti-fog property to prevent moisture from condensing on the surface of the heat seal layer 31, thereby helping the consumer to see through the polypropylene multilayer film and improve the gloss and freshness of the packaged product.

The polypropylene resin composition of the heat seal layer 31 is produced with at least one selected from the group consisting of propylene-ethylene-butene copolymer and propylene-butene copolymer. Furthermore, butene and propylene have similar structures and good compatibility, so that the heat seal layer 31 has high transparency.

Based on the total weight of the heat seal layer 31, a resin with the lowest melting point of 70-90° C. was in the contents of the propylene-ethylene-butene copolymer and propylene-butene copolymer of the heat seal layer 31, and the amount of the resin added was 1-10 wt %. If the addition amount of resin is less than 1 wt %, the strength between the heat seal layer 31 and the substrate layer 32 would be insufficient after being heat-sealed into a fruit and vegetable packaging bag, resulting in low heat sealing strength. If the addition amount of resin is more than 10 wt %, the strength between the heat seal layer 31 and the substrate layer 32 would high after heat-sealing into a fruit and vegetable packaging bag, resulting in high heat sealing strength, however the cost is too high.

Meanwhile, in order to improve the slip property of the produced fruit and vegetable packaging bag, inorganic particles can be appropriately added, about 1-7 wt % based on the total weight of the heat seal layer 31. In addition, the inorganic particles are one or more selected from the group consisting of silica, talc, and mica with a particle size between 0.2 µm and 10 µm.

If the addition amount of the inorganic particles is less than 1 wt % and the size of the inorganic particles is smaller than 0.2 µm, the slip property of the produced fruit and vegetable packaging bag would not be improved. If the addition amount of the inorganic particles is more than 7 wt % and the size of the inorganic particles is larger than 10 µm, the fruit and vegetable packaging bag would be too foggy and result in less transparency, which leads to inconveniences in the application of the fruit and vegetable packaging bag.

Referring to FIG. 1, the substrate layer 32 of the polypropylene multilayer film 30 of the present disclosure, which is the basic of the mechanical strength of the polypropylene multilayer film 30, is required to have heat resistance property.

The polypropylene resin composition of the substrate layer 32 is composed of at least one selected from the group consisting of propylene and a propylene-butene copolymer.

The substrate layer 32 has an overall melting point ranging from 150 to 170° C. Based on the total weight of the substrate layer 32, a resin with the lowest melting point of 70-90° C. was in the contents of the propylene-ethylenebutene copolymer and propylene-butene copolymer of the heat seal layer 31, and the amount of the resin added was 1-5 wt %. If the addition amount of resin is less than 1 wt %, the strength between the heat seal layer 31 and the substrate layer 32 would be insufficient after being heat-sealed into a fruit and vegetable packaging bag, resulting in low heat sealing strength. If the addition amount of resin is more than 5 wt %, the strength between the heat seal layer 31 and the substrate layer 32 would high after heat-sealing into a fruit and vegetable packaging bag, resulting in high heat sealing strength, however the cost is too high.

In particular, in order to extend the time of the anti-fog effect of the polypropylene multilayer film 30 of the present disclosure, an anti-fogging agent 34 was added to the polypropylene resin composition of the substrate layer 32. The anti-fogging mechanism of the polypropylene multilayer film 30 of the present disclosure is that, a hydrophilic group is generated on the surface of the heat-sealing layer 31 after corona treatment, and the anti-fog hydrophilic group added into the substrate layer 32 would migrate to the surface of the substrate layer 32, a water film is formed after the water droplets covered the surface of the substrate layer 32, such that the light would not be refracted or diffracted, so that the contents inside can be seen.

The anti-fogging agent 34 was added in an amount of 1-10 wt %, preferably 1.5-4.5 wt %, based on the total weight of the substrate layer 32. Further, the anti-fogging agent 34 is at least one selected from the group consisting of glycerin fatty acid esters, sorbitan fatty acid esters, glycerin monoesters, and sorbitan monoester ethylene oxide adducts.

Furthermore, the substrate layer 32 can be added with a processing aid to improve productivity. Such processing aid can be a heat stabilizer, an antioxidant, and so on.

Referring to FIG. 1, the surface layer 33 of the polypropylene multilayer film 30 of the present disclosure is required to have anti-fog property to prevent moisture from condensing on the surface of the surface layer 33. The fogged surface of the fruit and vegetable packaging bag placed in refrigerators may affect a consumer's willingness to purchase.

The polypropylene resin composition of the surface layer 33 is produced with at least one selected from the group consisting of propylene, propylene-ethylene-butene copolymer and propylene-butene copolymer. Furthermore, butene and propylene have similar structures and good compatibility, so that the heat seal layer 31 has high transparency.

Based on the total weight of the surface layer 33, a resin with the lowest melting point of 70-90° C. was in the contents of the surface layer 33, and the amount of the resin added was 1-10 wt %.

Meanwhile, in order to prevent the fruit and vegetable packaging bag from sticking during use, inorganic particles can be appropriately added, about 1-7 wt % based on the total weight of the surface layer 33. In addition, the inorganic particles are one or more selected from the group consisting of silica, talc, and mica with a particle size between 0.2 μm and 10 μm.

If the addition amount of the inorganic particles is less than 1 wt % and the size of the inorganic particles is smaller than 0.2 μm, the slip property of the produced fruit and vegetable packaging bag would not be improved. If the addition amount of the inorganic particles is more than 7 wt % and the size of the inorganic particles is larger than 10 μm, the produced fruit and vegetable packaging bag would be too foggy and result in less transparency, which leads to inconveniences in the application of the fruit and vegetable packaging bag.

The polypropylene multilayer film 30 of the present disclosure is produced by using a three-layer or five-layer co-extruder to produce a three-layer or five-layer co-extruded biaxially stretched polypropylene multilayer film. In addition, the temperature of the mixing section is set according to the melting point of the polypropylene resin, and the highest temperature is set to 225-245° C., after T-Die processing, the polypropylene multilayer film is cooled down, a temperature of a cooling area is controlled to be within 25-40° C. Machine direction orientation (MDO) is then performed with an extension ratio of 4-5 times, and then the transverse direction orientation (TDO) is performed with an extension ratio of 8-9 times. The retraction ratio of the TDO was set at 7-12%, and the polypropylene multilayer film was wound up after corona treatment.

The present disclosure is described in more detail below with reference to the preferred embodiments, which are to be construed in detail. In addition, the physical property evaluation of the fruit and vegetable anti-fog packaging bag of the present disclosure was tested by the following methods:

1. Anti-Fog Property (1) Anti-Fog at a Low Temperature of 4° C.:

100 ml of water was weighed and placed in a 250 ml beaker, and the anti-fog film was placed on the beaker. The beaker was then placed in a refrigerator at 4° C. for 5 minutes, and the anti-fog film was then taken out to observe for water droplets formed on the anti-fog film.

(2) Anti-Fog at a High Temperature of 40° C.:

100 ml of water at 40° C. was weighed and placed in a 250 ml beaker, and the anti-fog film was placed on the beaker. The beaker was then let sit for 10 seconds, and the anti-fog film was then observed for water droplets formed on the anti-fog film (3) Grading of Anti-Fog Property:

◯: Water vapor forms a water film on the surface of the anti-fog film without fog forming.

Δ: Water vapor forms a water film on the surface of the anti-fog film, and turns into water droplets later after, and cannot be seen through.

X: Water vapor forms water droplets on the surface of the anti-fog film and cannot be seen through.

2. Heat Sealing Strength (1) Preparation of Sample:

A sample size of 100 mm*100 mm was prepared. After the heat seal layer is stacked on the heat seal layer, a TESTER SANGYO TP-701-B heat seal tester is used for processing at a temperature of 160° C., a pressure of 0.1 MPa, for 0.5 seconds.

(2) Analysis of Heat Sealing Strength

After the sample is cut into parts of 15 mm by a tool, the heat seal site was analyzed by the tensile machine in a condition rate of 300 mm/min, in 180 degrees, and tested for five times to obtain an average value thereof.

(3) Grading of Heat Sealing Strength:

◯: 3.5 N/15 mm

Δ: 2.5-3.4 N/15 mm

X: <2.5 N/15 mm

3. Bag Processing and Thermal Fracturing Strength (1) Bag Processing with Anti-Fog Film The sample, which is a rolled type with a width of 600 mm, was processed by Totani HK 65V bag making machine at 400° C., at a production speed of 140, 170, 200 bags/min, and observed whether the fruit and vegetable anti-fog packaging bag can be collected smoothly during the bag making process, the size of the product was 300 mm*200 mm (2) Analysis of Thermal Fracturing Strength:

After the sample is cut into parts of 15 mm by a tool, the heat seal site was analyzed by the tensile machine in a condition rate of 300 mm/min, in 180 degrees, and tested for five times to obtain an average value thereof.

(3) Grading of Heat Sealing Strength:

○: 18 N/15 mm

Δ: 16-17.9 N/15 mm

X: <15.9 N/15 mm

4. Slip Property

The bag mouth of the fruit and vegetable anti-fog packaging bag was rubbed together by a thumb and forefinger to test the slip property of the bag mouth.

(1) Grading of Slip Property:

○: The bag mouth can be easily opened and does not stick together.

Δ: The bag mouth is slightly sticky.

X: The bag mouth is sticky.

5. Transparency

Ten the fruit and vegetable anti-fog packaging bags are overlapped, and the pattern shape is placed underneath to visually observe the transparency.

(1) Grading of Transparency:

○: The pattern shape is clear.

Δ: The pattern shape is foggy.

X: The pattern shape is blurred.

The content of resin in the embodiments and the comparison example are described as follows.

(PP-1): homopolypropylene, manufactured by Sinopec. Product name: PR-FT03-S. MFR: 3.1 g/10 min, and melting point: 165° C.

(PP-2): general polypropylene-ethylene-butene, manufactured by Sumitomo. Product name: SP7731. MFR: 7 g/10 min, and melting point: 132° C.

(PP-3): general copolypropylene-butene, manufactured by Mitsui. Product name: XM-7070. MFR: 7 g/10 min, and melting point: 75° C.

(AF-1): anti-fogging masterbatch, manufactured by Riken. Product name: PAT-381, carrier resin. MFR: 7.5 g/10 min.

(AB-1): inorganic $SiO_2$ open agent, manufactured by A. schulman. Product name: ABVT 20, and size: 0.5-1 μm.

(AB-2): inorganic $SiO_2$ open agent, manufactured by Constab. Product name: AB 06095 PP, and size: 2 μm.

(AB-3): inorganic $SiO_2$ open agent, manufactured by Constab. Product name: AB 0619 PP, and size: 4 μm.

First Embodiment

A polypropylene multilayer film having a thickness of 20 μm was produced, which is a three-layer laminated structure including a heat seal layer of 1 μm, a substrate layer 32 of 18 μm, and a surface layer 33 of 1 μm. The polypropylene resin composition of each layer was as following:

1. Resin of the Heat Seal Layer

1% of the general copolypropylene-butene (PP-3), 3.5% of the inorganic $SiO_2$ open agent (AB-2) and 1% of the inorganic $SiO_2$ open agent (AB-3) were added, based on the weight of the general polypropylene-ethylene-butene (PP-2).

2. Resin of the Substrate Layer 32

1% of the general copolypropylene-butene (PP-3) and 1.5% of the anti-fogging masterbatch (AF-1) were added, based on the weight of the homopolypropylene (PP-1).

3. Resin of Surface Layer

1% of the general copolypropylene-butene (PP-3), 3.5% of the inorganic $SiO_2$ open agent (AB-2) and 1% of the inorganic $SiO_2$ open agent (AB-3) were added, based on the weight of the general polypropylene-ethylene-butene (PP-2).

Polypropylene Multilayer Film Production

The production was processed by using a three-layer co-extrusion machine. The mixing section was set according to the melting point of the polypropylene resin, and the highest temperature was set at 245° C. The thickness ratio of the heat seal layer:base material layer:surface layer was 1:18:1, and cooled down after T-Die processing, the cooling zone temperature is controlled to be at 35° C. Machine direction (MD) extension was then performed with an extension ratio of 4.4 times that of the initial film of the size, and then the transverse direction (TD) extension was performed with an extension ratio of 9 times that of the initial film of the size. The retraction ratio was set at 8%, and the polypropylene multilayer film was wound up after corona treatment.

The physical properties of the polypropylene multilayer film produced this way were tested, and the results are shown in Table 1.

Second Embodiment

The production of the second embodiment was the same as the first embodiment except that the anti-fogging masterbatch in the substrate layer of the second embodiment was increased to 2.5 wt %.

The physical properties of the polypropylene multilayer film produced this way were tested, and the results are shown in Table 1.

Third Embodiment

The production of the third embodiment was the same as the second embodiment except that the PP-3 in the heat seal layer and the surface layer of the third embodiment were increased to 5 wt %.

The physical properties of the polypropylene multilayer film produced this way were tested, and the results are shown in Table 1.

Fourth Embodiment

The production of the fourth embodiment was the same as the third embodiment except that the PP-3 in the heat seal layer and the surface layer of the fourth embodiment were increased to 10 wt %.

The physical properties of the polypropylene multilayer film produced this way were tested, and the results are shown in Table 1.

Fifth Embodiment

The production of the fifth embodiment was the same as the fourth embodiment except that the PP-3 in the substrate layer of the fifth embodiment was increased to 5 wt %.

The physical properties of the polypropylene multilayer film produced this way were tested, and the results are shown in Table 1.

Sixth Embodiment

The production of the sixth embodiment was the same as the fifth embodiment except that the inorganic $SiO_2$ open agent in the heat seal layer and the surface layer of the sixth embodiment were AB-2.

The physical properties of the polypropylene multilayer film produced this way were tested, and the results are shown in Table 1.

Seventh Embodiment

The production of the seventh embodiment was the same as the sixth embodiment except that the inorganic $SiO_2$ open agent in the heat seal layer and the surface layer of the seventh embodiment were 1 wt % of AB-1.

The physical properties of the polypropylene multilayer film produced this way were tested, and the results are shown in Table 1.

Eighth Embodiment

The production of the eighth embodiment was the same as the seventh embodiment except that the inorganic $SiO_2$ open agent AB-1 in the heat seal layer and the surface layer of the eighth embodiment were increased to 2 wt %.

The physical properties of the polypropylene multilayer film produced this way were tested, and the results are shown in Table 1.

Ninth Embodiment

The MDO extension ratio in the ninth embodiment was lowered to 4.0, and the TDO retraction ratio was increased to 10 wt %. The remaining conditions were the same as the eighth embodiment.

The physical properties of the polypropylene multilayer film produced this way were tested, and the results are shown in Table 1.

First Comparison Example

The production of the first comparison example was the same as the first embodiment except that the general copolypropylene-butene PP-3 was not added to the first comparison example.

The physical properties of the polypropylene multilayer film produced this way were tested, and the results are shown in Table 2.

Second Comparison Example

The production of the second compared example was the same as the first embodiment except that the inorganic $SiO_2$ open agent AB-2 of the second compared example was decreased to 1 wt % and the AB-3 was increased to 3.5 wt %.

The physical properties of the polypropylene multilayer film produced this way were tested, and the results are shown in Table 2.

Third Comparison Example

The production of the third compared example was the same as the first embodiment except that the anti-fogging masterbatch of the third compared example was increased to 4 wt %.

The physical properties of the polypropylene multilayer film produced this way were tested, and the results are shown in Table 2.

Fourth Comparison Example

The production of the fourth compared example was the same as the fourth embodiment except that the general copolypropylene-butene PP-3 in the substrate layer of the fourth compared example was increased to 10 wt %.

The physical properties of the polypropylene multilayer film produced this way were tested, and the results are shown in Table 2.

Fifth Comparison Example

The production of the fifth compared example was the same as the ninth embodiment except that the inorganic $SiO_2$ open agent AB-1 and AB-2 of the fifth compared example were increased by 1.5 times.

The physical properties of the polypropylene multilayer film produced this way were tested, and the results are shown in Table 2.

TABLE 1

| | Items | \multicolumn{9}{c}{Embodiments} | | | | | | | | |
|---|---|---|---|---|---|---|---|---|---|---|
| | | 1 | 2 | 3 | 4 | 5 | 6 | 7 | 8 | 9 |
| heat seal layer (A) | PP-2 (wt %)-melting point 132° C. | 94.5 | 94.5 | 90.5 | 85.5 | 85.5 | 85.5 | 85.5 | 85.5 | 85.5 |
| | PP-3 (wt %)- melting point 75° C. | 1.0 | 1.0 | 5.0 | 10.0 | 10.0 | 10.0 | 10.0 | 10.0 | 10.0 |
| | AB-1 (wt %)-0.5-1 μm | 0 | 0 | 0 | 0 | 0 | 0 | 1 | 2 | 2 |
| | AB-2 (wt %)-2 μm | 3.5 | 3.5 | 3.5 | 3.5 | 3.5 | 4.5 | 3.5 | 2.5 | 2.5 |
| | AB-3 (wt %)-4 μm | 1.0 | 1.0 | 1.0 | 1.0 | 1.0 | 0 | 0 | 0 | 0 |
| substrate layer (B) | PP-1 (wt %)- melting point 165° C. | 97.5 | 96.5 | 96.5 | 96.5 | 92.5 | 96.5 | 96.5 | 96.5 | 96.5 |
| | PP-3 (wt %)- melting point 75° C. | 1.0 | 1.0 | 1.0 | 1.0 | 5.0 | 1.0 | 1.0 | 1.0 | 1.0 |
| | AF-1 (wt %) | 1.5 | 2.5 | 2.5 | 2.5 | 2.5 | 2.5 | 2.5 | 2.5 | 2.5 |
| surface layer (C) | PP-2 (wt %)- melting point 132° C. | 94.5 | 94.5 | 90.5 | 85.5 | 85.5 | 85.5 | 85.5 | 85.5 | 85.5 |
| | PP-3 (wt %)- melting point 75° C. | 1.0 | 1.0 | 5.0 | 10.0 | 10.0 | 10.0 | 10.0 | 10.0 | 10.0 |
| | AB-1 (wt %)-0.5-1 μm | 0 | 0 | 0 | 0 | 0 | 0 | 1 | 2 | 2 |
| | AB-2 (wt %)-2 μm | 3.5 | 3.5 | 3.5 | 3.5 | 3.5 | 4.5 | 3.5 | 2.5 | 2.5 |
| | AB-3 (wt %)-4 μm | 1.0 | 1.0 | 1.0 | 1.0 | 1.0 | 0 | 0 | 0 | 0 |
| MDO extension ratio (%) | | 4.4 | 4.4 | 4.4 | 4.4 | 4.4 | 4.4 | 4.4 | 4.4 | 4.0 |
| TDO extension ratio (%) | | 9 | 9 | 9 | 9 | 9 | 9 | 9 | 9 | 9 |
| TDO retraction ratio (%) | | 8.0 | 8.0 | 8.0 | 8.0 | 8.0 | 8.0 | 8.0 | 8.0 | 10.0 |

TABLE 1-continued

|  |  | Embodiments | | | | | | | | |
|---|---|---|---|---|---|---|---|---|---|---|
| Items | | 1 | 2 | 3 | 4 | 5 | 6 | 7 | 8 | 9 |
| thickness (μm) | heat seal layer (A) | 1 | 1 | 1 | 1 | 1 | 1 | 1 | 1 | 1 |
|  | substrate layer (B) | 18 | 18 | 18 | 18 | 18 | 18 | 18 | 18 | 18 |
|  | surface layer (C) | 1 | 1 | 1 | 1 | 1 | 1 | 1 | 1 | 1 |
| Anti-fog property | | Δ | O | O | O | O | O | O | O | O |
| Heat sealing strength (N/15 mm) | | Δ | Δ | Δ | O | O | O | O | O | O |
| Bag processing | | OK | OK | OK | OK | OK | OK | OK | OK | OK |
| thermal fracturing strength (N/15 mm) | 140 bags/min | O | O | O | O | O | O | O | O | O |
|  | 170 bags/min | X | X | X | Δ | O | Δ | Δ | Δ | O |
|  | 200 bags/min | X | X | X | X | Δ | X | X | Δ | O |
| Slip property | | O | O | O | O | O | O | O | O | O |
| Transparency | | O | O | O | O | O | O | O | O | O |

TABLE 2

|  |  | Compared examples | | | | |
|---|---|---|---|---|---|---|
| Items | | 1 | 2 | 3 | 4 | 5 |
| heat seal layer (A) | PP-2 (wt %)-melting point 132° C. | 95.5 | 94.5 | 94.5 | 85.5 | 83.25 |
|  | PP-3 (wt %)- melting point 75° C. | 0 | 1.0 | 1.0 | 10.0 | 10.0 |
|  | AB-1 (wt %)-0.5-1 μm | 0 | 0 | 0 | 0 | 3 |
|  | AB-2 (wt %)-2 μm | 3.5 | 1 | 3.5 | 3.5 | 3.75 |
|  | AB-3 (wt %)-4 μm | 1.0 | 3.5 | 1.0 | 1.0 | 0 |
| substrate layer (B) | PP-1 (wt %)- melting point 165° C. | 97.5 | 97.5 | 95.0 | 87.5 | 95.5 |
|  | PP-3 (wt %)- melting point 75° C. | 0 | 1.0 | 1.0 | 10.0 | 1.0 |
|  | AF-1 (wt %) | 1.5 | 1.5 | 4.0 | 2.5 | 2.5 |
| surface layer (C) | PP-2 (wt %)- melting point 132° C. | 95.5 | 94.5 | 94.5 | 85.5 | 83.25 |
|  | PP-3 (wt %)- melting point 75° C. | 0 | 1.0 | 1.0 | 10.0 | 10.0 |
|  | AB-1 (wt %)-0.5-1 μm | 0 | 0 | 0 | 0 | 3 |
|  | AB-2 (wt %)-2 μm | 3.5 | 3.5 | 3.5 | 3.5 | 3.75 |
|  | AB-3 (wt %)-4 μm | 1.0 | 1.0 | 1.0 | 1.0 | 0 |
| MDO extension ratio (%) | | 4.4 | 4.4 | 4.4 | 4.4 | 4.0 |
| TDO extension ratio (%) | | 9 | 9 | 9 | 9 | 9 |
| TDO retraction ratio (%) | | 8.0 | 8.0 | 8.0 | 8.0 | 10.0 |
| thickness (μm) | heat seal layer (A) | 1 | 1 | 1 | 1 | 1 |
|  | substrate layer (B) | 18 | 18 | 18 | 18 | 18 |
|  | surface layer (C) | 1 | 1 | 1 | 1 | 1 |
| Anti-fog property | | Δ | Δ | O | O | O |
| Heat sealing strength (N/15 mm) | | X | Δ | Δ | O | O |
| Bag processing | | OK | OK | OK | NG | OK |
| thermal fracturing strength (N/15 mm) | 140 bags/min | O | O | O | Δ | O |
|  | 170 bags/min | X | X | X | Δ | O |
|  | 200 bags/min | X | X | X | Δ | O |
| Slip property | | O | O | O | O | O |
| Transparency | | O | O | O | O | Δ |

CONCLUSION

1. In the first and second embodiments, and the third compared example, the anti-fog effect of the polypropylene multilayer film was improved as the amount of the anti-fogging agent masterbatch was increased, and the optimal addition amount of the anti-fogging agent masterbatch is 2.5 wt %.

2. In the second, third and fourth embodiments, and the first compared example, the heat sealing strength was greater than or equal to 3.5 N/15 mm when the general copolypropylene-butene in the heat seal layer and the surface layer was added to 10 wt %. The reason is that the addition of a low melting point general copolymer polypropylene-butene can shorten the melting time of the resin, and the butene has a similar structure to propylene and has good compatibility, resulting in the high transparency.

3. In the fourth and fifth embodiments, and the fourth compared example, the bag processing property of the polypropylene multilayer film was lower when the general copolypropylene-butene in the surface layer was increased to 10 wt %; this is resulted from the poor stiffness of the polypropylene resin multilayer film.

4. In the sixth, seventh, and eighth embodiments, with the same addition amount of 4.5 wt % of the inorganic $SiO_2$ open agent, as the ratio of the small size inorganic $SiO_2$ open agent increased, the thermal fracturing strength after bag making significantly improved (400° C.*200 bags).

5. In the eighth and ninth embodiments, with the same addition amount of 4.5 wt % of the inorganic $SiO_2$ open agent, as the extension ratio of machine direction orientation (MDO) was reduced to 4 times and the retraction ratio of the transverse direction orientation (TDO) was increased to 10% during the polypropylene multilayer film production, the crystal setting of the polypropylene multilayer film increased, so that the shrinkage during the bag making process can be reduced and the fusion part had good uniformity and the thermal fusing strength was high (400° C.*200 bags).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fruit and vegetable anti-fog packaging bag, which is produced with a three-layer laminated polypropylene multilayer film with a total thickness of 15-80 μm, wherein the polypropylene multilayer film has a heat seal layer, a surface layer or heat seal layer, and a substrate layer sandwiched between the heat seal layer and the surface layer or the heat seal layer, characterized in that:

the heat seal layer is produced with at least one selected from the group consisting of propylene-ethylene-butene copolymer and propylene-butene copolymer, and the surface of the heat seal layer is treated with corona, wherein the heat seal layer further includes 1-10 wt % of resin based on the total weight of the heat seal layer, and the melting point of the resin is from 70° C. to 90° C. wherein the heat seal layer includes three $SiO_2$ agents that are respectively defined as a first $SiO_2$ agent is within a range of 0.5 to 1 μm, a particle size of the second $SiO_2$ agent is 2 μm, and a particle size of the third $SiO_2$ agent is 4 μm, and wherein based on 100 parts by weight of the heat seal layer, a content of the first $SiO_2$ agent is greater than 0 and less than or equal to 2 part by weight, a content of the second $SiO_2$ agent is 2.5 to 4.5 part by weight, and a content of the third $SiO_2$ agent is greater than 0 and less than or equal to 1 part by weight;

the substrate layer is produced with at least one selected from the group consisting of propylene and propylene-butene copolymer, and the substrate layer includes 1-10 wt % of anti-fogging agent, wherein the substrate layer further includes 1-5 wt % of resin based on the total weight of the substrate layer, and the melting point of the resin is from 70° C. to 90° C.; and the surface layer is produced with at least one selected from the group consisting of propylene, propylene-ethylene-butene copolymer and propylene-butene copolymer, wherein the surface layer further includes 1-10 wt % of resin based on the total weight of the surface layer, and the melting point of the resin is from 70° C. to 90° C.

2. The fruit and vegetable anti-fog packaging bag according to claim 1, wherein based on the total thickness of the polypropylene multilayer film, the heat seal layer accounts for 4-10%, the substrate layer accounts for 80-92%, and the surface layer accounts for 4-10%.

3. The fruit and vegetable anti-fog packaging bag according to claim 1, wherein the anti-fogging agent is one or more selected from the group consisting of glycerin fatty acid esters, sorbitan fatty acid esters, glycerin monoesters, and sorbitan monoester ethylene oxide adducts.

4. The fruit and vegetable anti-fog packaging bag according to claim 2, wherein the anti-fogging agent is one or more selected from the group consisting of glycerin fatty acid esters, sorbitan fatty acid esters, glycerin monoesters, and sorbitan monoester ethylene oxide adducts.

5. The fruit and vegetable anti-fog packaging bag according to claim 1, wherein the heat sealing strength of the heat seal layer is equal to or greater than 3.5N/15 mm.

6. The fruit and vegetable anti-fog packaging bag according to claim 1, wherein the surface layer further includes 1-7 wt % inorganic particles based on the total weight of the surface layer, and the inorganic particles are one or more selected from the group consisting of silica, talc, and mica with a particle size between 0.2 μm and 10 μm.

* * * * *